(12) United States Patent
Yun et al.

(10) Patent No.: US 8,751,136 B2
(45) Date of Patent: Jun. 10, 2014

(54) METHODOLOGY TO COMPENSATE THE EFFECT OF HUMIDITY AND ALTITUDE ON HCCI COMBUSTION

(75) Inventors: Hanho Yun, Oakland Township, MI (US); Nicole Wermuth, Munich (DE); Paul M. Najt, Bloomfield Hills, MI (US); Jun-Mo Kang, Ann Arbor, MI (US); Chen-Fang Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 392 days.

(21) Appl. No.: 13/185,560

(22) Filed: Jul. 19, 2011

(65) Prior Publication Data
US 2013/0024091 A1    Jan. 24, 2013

(51) Int. Cl.
F02D 41/04    (2006.01)
F02D 41/14    (2006.01)
F02D 41/00    (2006.01)

(52) U.S. Cl.
CPC .... *F02D 41/1454* (2013.01); *F02D 2200/0418* (2013.01)
USPC .......................................... 701/103; 123/704

(58) Field of Classification Search
CPC ..................... F02D 41/1454; F02D 2200/0418
USPC .................. 701/103, 102; 123/704, 677, 690, 123/90.15, 568.22
See application file for complete search history.

(56) References Cited

U.S. PATENT DOCUMENTS

| | | | |
|---|---|---|---|
| 7,318,409 B2 * | 1/2008 | Cullen | 123/399 |
| 7,363,911 B2 * | 4/2008 | Brehob | 123/406.47 |
| 7,398,775 B2 * | 7/2008 | Cullen | 123/677 |
| 2005/0072404 A1 * | 4/2005 | Cullen | 123/399 |
| 2005/0072406 A1 * | 4/2005 | Cullen | 123/494 |
| 2005/0211209 A1 * | 9/2005 | Cullen | 123/90.17 |
| 2007/0095328 A1 * | 5/2007 | Brehob | 123/406.47 |
| 2007/0181111 A1 * | 8/2007 | Cullen | 123/677 |
| 2008/0059049 A1 * | 3/2008 | Totten et al. | 701/105 |

* cited by examiner

*Primary Examiner* — Mahmoud Gimie

(57) ABSTRACT

A method for controlling combustion in a spark-ignition direct-injection internal combustion engine includes monitoring an engine operating mode and an ambient parameter, determining a deviation of the ambient parameter relative to a nominal ambient parameter, determining a nominal desired engine operation parameter based on engine speed and load, determining and adjusted desired engine operation parameter based on the nominal desired engine operation parameter and said deviation of the ambient parameter, and controlling the engine based on the engine operating mode and one of the nominal desired engine operation parameter and adjusted desired engine operation parameter.

12 Claims, 4 Drawing Sheets

METHODOLOGY TO COMPENSATE THE EFFECT OF HUMIDITY AND ALTITUDE ON HCCI COMBUSTION

TECHNICAL FIELD

This disclosure relates to operation and control of homogeneous-charge compression-ignition (HCCI) engines.

BACKGROUND

The statements in this section merely provide background information related to the present disclosure. Accordingly, such statements are not intended to constitute an admission of prior art.

Internal combustion engines, especially automotive internal combustion engines, generally fall into one of two categories, spark ignition engines and compression ignition engines. Traditional spark ignition engines, such as gasoline engines, function by introducing a fuel/air mixture into the combustion cylinders, which is then compressed in the compression stroke and ignited by a spark plug. Traditional compression ignition engines, such as diesel engines, typically function by introducing or injecting pressurized fuel into a combustion cylinder near top dead center (TDC) of the compression stroke, which ignites upon injection. Combustion for both traditional gasoline engines and diesel engines involves premixed or diffusion flames that are controlled by fluid mechanics. Each type of engine has advantages and disadvantages. In general, gasoline engines produce fewer emissions but are less efficient, while, in general, diesel engines are more efficient but produce more emissions.

More recently, other types of combustion methodologies have been introduced for internal combustion engines. One of these combustion concepts is known in the art as the homogeneous charge compression ignition (HCCI). The HCCI combustion mode includes a distributed, flameless, auto-ignition combustion process that is controlled by oxidation chemistry, rather than by fluid mechanics. In a typical engine operating in HCCI combustion mode, the cylinder charge is nearly homogeneous in composition temperature at intake valve closing time. Because auto-ignition is a distributed kinetically-controlled combustion process, the engine operates at a very dilute fuel/air mixture (i.e., lean of a fuel/air stoichiometric point) and has a relatively low peak combustion temperature, thus forming extremely low nitrous oxides (NOx) emissions. The fuel/air mixture for auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the auto-ignition combustion mode can operate unthrottled to achieve diesel-like fuel economy. The HCCI engine can also operate at stoichiometry with substantial amounts of exhaust gas recirculation (EGR).

There is no direct control of start of combustion for an engine operating in the auto-ignition mode, as the chemical kinetics of the in-cylinder charge composition determine the start and course of the combustion. The chemical kinetics of the in-cylinder charge composition (i.e., in-cylinder oxygen mass) are sensitive to ambient conditions that include intake air temperature, altitude and humidity. As such, these ambient conditions can influence the maximum efficiency and robustness during HCCI operation and when the engine is operating at stoichiometry with substantial amounts of EGR. It is known, for example, that as humidity increases, a portion of oxygen and nitrogen in the mass airflow is replaced by water vapor leaving less oxygen available within the in-cylinder charge composition for combustion. In other words, the in-cylinder oxygen mass decreases with increasing humidity where the chemical kinetic reaction for auto-ignition would slow down due to the effect of water vapor. It is further known, for example, that as the altitude changes, the in-cylinder oxygen mass can vary. For instance, as altitude increases the in-cylinder oxygen mass decreases.

SUMMARY

A method for controlling combustion in a spark-ignition direct-injection internal combustion engine includes monitoring an engine operating mode and an ambient parameter, determining a deviation of the ambient parameter relative to a nominal ambient parameter, determining a nominal desired engine operation parameter based on engine speed and load, determining and adjusted desired engine operation parameter based on the nominal desired engine operation parameter and said deviation of the ambient parameter, and controlling the engine based on the engine operating mode and one of the nominal desired engine operation parameter and adjusted desired engine operation parameter.

BRIEF DESCRIPTION OF THE DRAWINGS

One or more embodiments will now be described, by way of example, with reference to the accompanying drawings, in which.

DETAILED DESCRIPTION

Figure 1:
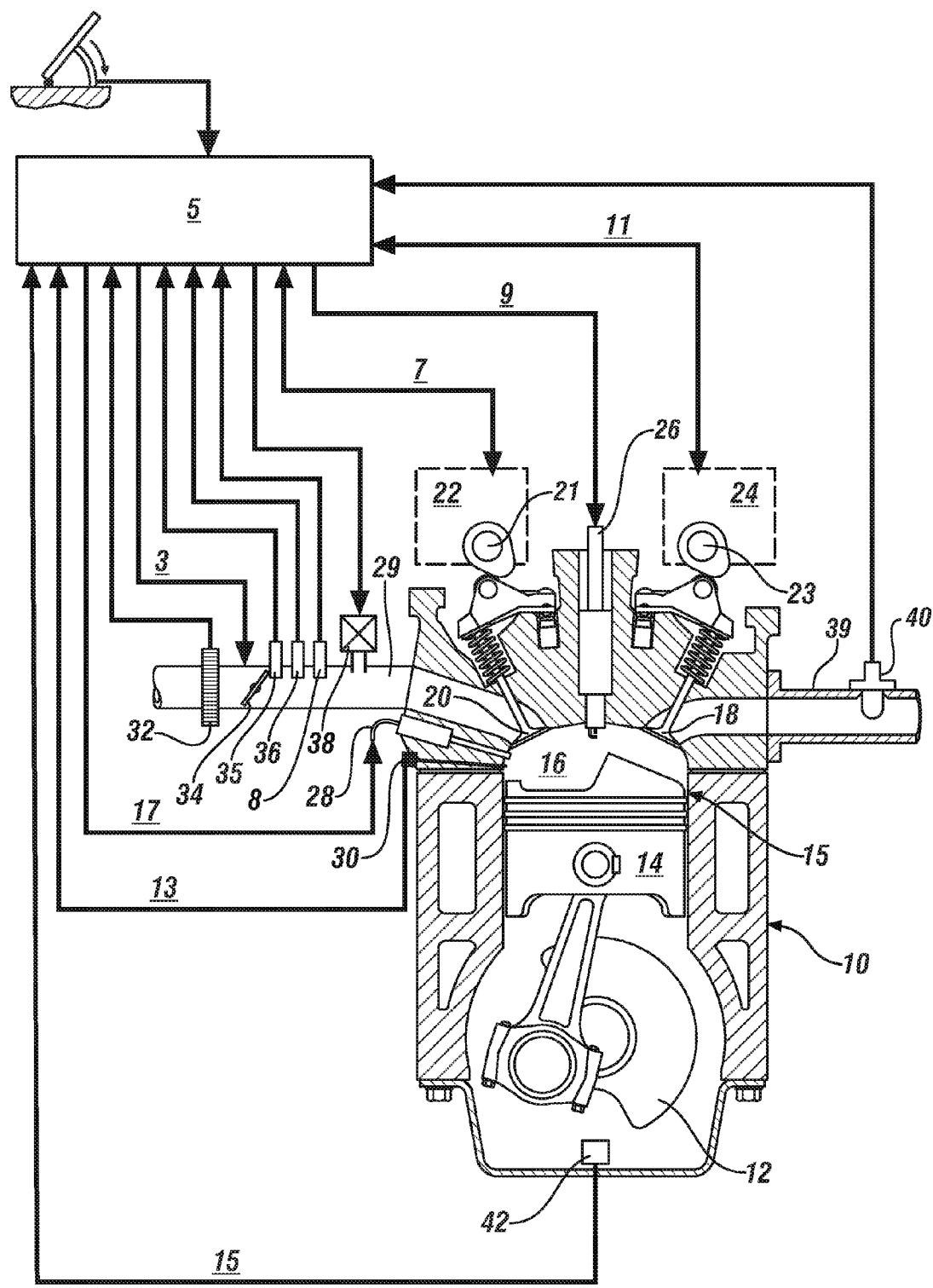
FIG. 1 illustrates an exemplary engine system in accordance with the present disclosure.

Referring now to the drawings, wherein the depictions are for the purpose of illustrating certain exemplary embodiments only and not for the purpose of limiting the same, FIG. 1 schematically shows an exemplary internal combustion engine 10 and an accompanying control module 5 that have been constructed in accordance with an embodiment of the disclosure. The engine 10 is selectively operative in a plurality of combustion modes, including a controlled auto-ignition (HCCI) combustion mode and a homogeneous spark-ignition (SI) combustion mode. The engine 10 can be selectively operative at a stoichiometric air-fuel ratio or at an air-fuel ratio that is primarily lean of stoichiometry. It is appreciated that the concepts in the disclosure can be applied to other internal combustion engine systems and combustion cycles.

In one embodiment the engine 10 can be coupled to a transmission device to transmit tractive power to a driveline of a vehicle. The transmission can include a hybrid transmission including torque machines operative to transfer tractive power to a driveline.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the airflow. The air intake devices preferably include a mass airflow sensor 32 for monitoring mass airflow and intake air temperature. A throttle valve 34 preferably includes an electronically controlled device that is used to control airflow to the engine 10 in response to a control signal (ETC) from the control module 5. A humidity sensor 35 in the intake manifold 29 is configured to monitor ambient humidity. A pressure sensor 36 in the intake manifold 29 is configured to monitor manifold absolute pressure and barometric pressure. In association with the control module 5, the pressure sensor 36 monitoring barometric pressure can determine changes in altitude of the engine 10. Thus, altitude corresponds to ambient pressure (i.e. barometric pressure) and can be monitored. An external flow passage recirculates exhaust gases from engine exhaust to the intake manifold 29, having a flow control valve referred to as an external exhaust gas recirculation (EGR) valve 38. The control module 5 is operative to control mass flow of exhaust gas to the intake manifold 29 by controlling opening of the EGR valve 38. Hence, an intake oxygen concentration entering the engine can be controlled by controlling the EGR valve 38 position. In an exemplary embodiment, the intake oxygen concentration in the intake manifold 29 when the EGR valve is closed is substantially 21%. The intake oxygen concentration can be monitored by an oxygen sensor 8.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. The openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 and variably adjust and control phasing of the intake camshaft 21 for each cylinder 15 in response to a control signal 7 from the control module 5. The exhaust VCP/VLC device 24 preferably includes a controllable mechanism operative to variably switch and control valve lift of the exhaust valve(s) 18 and variably adjust and control phasing of the exhaust camshaft 23 for each cylinder 15 in response to a control signal 11 from the control module 5.

The intake and exhaust VCP/VLC devices 22 and 24 each preferably include a controllable two-step variable lift control (VLC) mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18, respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each configured to directly inject a mass of fuel into one of the combustion chambers 16 in response to a signal 17 from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal 9 from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air-fuel ratio sensor. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine an indicated mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

In operation, the control module 5 monitors inputs from the aforementioned sensors to determine states of engine parameters. The control module 5 is configured to receive input signals from an operator (e.g., via an accelerator pedal and a brake pedal) to determine a torque request (To_req). It will be appreciated that the torque request can be in response to an operator input (e.g., via the accelerator pedal and the brake pedal) or the torque request can be in response to an auto start condition monitored by the control module 5. The control module 5 monitors the sensors indicating the engine speed and intake air temperature, and coolant temperature and other ambient conditions.

The control module 5 executes routines stored therein to control the aforementioned actuators to form the cylinder charge, including controlling throttle position, spark-ignition timing, injected fuel mass and timing, EGR valve position opening to control flow of recirculated exhaust gases, and intake and/or exhaust valve timing and phasing on engines so equipped. Valve timing and phasing can include negative valve overlap (NVO) and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air-fuel ratio based upon feedback from the exhaust gas sensor 40.

During engine operation, the throttle valve 34 is preferably substantially wide-open in the controlled auto-ignition (HCCI) combustion modes, e.g., single and double injection controlled auto-ignition (HCCI) combustion modes, with the engine 10 controlled at a lean or stoichiometric air-fuel ratio. Substantially wide-open throttle can include operating fully un-throttled, or slightly throttled to create a vacuum in the intake manifold 29 to affect EGR flow. In one embodiment, internal residual gas is controlled to a high dilution rate. The intake and exhaust valves 20 and 18 are in the low-lift valve position and the intake and exhaust lift timing operate with NVO. One or more fuel injection events can be executed during an engine cycle including at least one fuel injection event during a compression phase.

During engine operation in the homogeneous spark-ignition (SI) combustion mode, the throttle valve 34 is controlled to regulate the air flow. The engine 10 is controlled to a stoichiometric air-fuel ratio, and the intake and exhaust valves 20 and 18 are in the high-lift valve open position and the intake and exhaust lift timing operate with a positive valve overlap. Preferably, a fuel injection event is executed during compression phase of an engine cycle, preferably substantially before TDC. Spark ignition is preferably discharged at a predetermined time subsequent to the fuel injection when air charge within the cylinder is substantially homogeneous.

Combustion phasing in each cylinder depends upon the thermal environment within each cylinder when the engine is operating in the controlled auto-ignition (HCCI) mode including spark-assisted HCCI mode during high-load operation. Combustion phasing describes the progression of combustion in a cycle as measured by the crank angle of the cycle. One convenient metric to judge combustion phasing is CA50 or the crank angle at which 50% of the air fuel charge is combusted. One will appreciate that properties of a combustion cycle, such as efficiency, combustion noise and combustion stability, are affected by CA50 of the cycle. Thus, maintaining an optimal/desired combustion phasing is important during high load HCCI operation. During a specified injection timing, spark timing and valve timings for a cylinder event, an un-balanced combustion phasing can result in each cylinder due to non-uniform in-cylinder conditions including non-uniform distribution of the external EGR percentage, non-uniform in-cylinder thermal conditions and/or variations from injector-to-injector in each cylinder. Therefore, a fixed calibration of the injection timing and spark timing is not desirable due to the non-uniform in-cylinder conditions. Likewise, a fixed calibration of intake oxygen concentration entering the engine and a fixed in-cylinder air-fuel ratio is not desirable due to ambient parameters influencing in-cylinder oxygen mass, and thereby, influencing the combustion phasing. Variations in in-cylinder oxygen mass can influence the combustion phasing to deviate from a desired combustion phasing. Based on the engine operating mode (i.e., stoichiometric air-fuel ratio or air-fuel ratio lean of stoichiometry) and monitored ambient parameters deviating from respective desired ambient parameters, a desired in-cylinder oxygen mass can be adjusted to compensate for the deviation between the monitored ambient parameters and the respective ambient parameters to thereby maintain a desired combustion phasing.

Depending upon the monitored engine operating mode and at least one monitored ambient parameter deviating from a respective desired ambient parameter, adjustments to the desired in-cylinder oxygen mass can be effected by adjusting a desired in-cylinder air-fuel ratio and/or adjusting a desired intake oxygen concentration entering each cylinder of the engine. Further, the adjusted desired intake oxygen concentration is achieved by controlling external EGR percentage entering the engine via the EGR valve 38 position and the adjusted desired in-cylinder air-fuel ratio is achieved by controlling internal residual gas via NVO within the engine. Maintaining a desired combustion phasing for a given engine speed, injected fuel mass and/or load is desirable for achieving acceptable combustion properties. The combustion properties can include combustion noise, combustion efficiency and combustion stability.

Embodiments envisioned utilize control strategies (i.e., a humidity compensation controller and/or an altitude compensation controller) for adjusting a desired in-cylinder oxygen mass determined for maintaining a desired combustion phasing when ambient parameters (e.g., humidity and/or altitude) are monitored and deviate from respective nominal or desired ambient parameters. When ambient parameters including humidity and/or altitude deviate from respective desired ambient parameters, the desired in-cylinder oxygen mass can deviate, and thereby, influence combustion phasing. The control strategies enable the desired combustion phasing to be adjusted to maintain the desired combustion phasing without the use of set point calibration as a function of humidity and/or altitude. As aforementioned, determining set point calibration as a function of humidity and/or altitude can be very time consuming. The control strategies for maintaining the desired combustion phasing are operative over all types of injected fuel masses (e.g., single and/or split) and all engine operating modes including controlled auto-ignition (HCCI) mode including spark-assisted HCCI mode during high-load operation, low- and medium-load auto-ignition (HCCI) operation and stoichiometric air-fuel operation. Engine operating modes having air-fuel ratios lean of stoichiometry can include the controlled auto-ignition (HCCI) mode including spark-assisted HCCI mode during high-load operation and low- and medium-load auto-ignition (HCCI) operation. The engine operating mode having the stoichiometric air-fuel ratio will hereinafter be referred to as stoichiometric. The engine operating mode having the air-fuel ratio lean of stoichiometry will hereinafter be referred to as lean of stoichiometry.

In a non-limiting scenario, when the engine operating mode is stoichiometric and the monitored ambient parameter including a monitored humidity deviates from a nominal humidity, the intake oxygen concentration entering the engine can be maintained to maintain the desired combustion phasing without adjusting the desired in-cylinder oxygen mass because any changes to the in-cylinder oxygen concentration due to humidity are offset by adjusting the external EGR percentage directly entering the engine when the engine operating mode is stoichiometric. In a non-limiting example, the intake oxygen concentration can be maintained by decreasing the external EGR entering the engine when the monitored humidity is greater than a desired or nominal humidity. In another non-limiting example, the intake oxygen concentration can be maintained by increasing the external EGR entering the engine when the monitored humidity is less than the desired or nominal humidity.

The monitored humidity can be obtained by monitoring the humidity sensor 35. In a non-limiting example, any monitored humidity that is greater than the nominal or nominal humidity can result in the intake oxygen concentration below 21 percent.

In a non-limiting scenario, when the engine operating mode is lean of stoichiometry and the monitored ambient parameter including a monitored humidity deviates from a nominal humidity, the desired in-cylinder oxygen mass can be adjusted to maintain the desired combustion phasing by adjusting a desired in-cylinder air-fuel. The desired in-cylinder oxygen mass and the desired in-cylinder air-fuel ratio are determined based on engine speed and load. In a non-limiting example, the desired in-cylinder air-fuel ratio can be decreased when the monitored humidity is greater than the nominal humidity. In another non-limiting example, the desired in-cylinder air-fuel ratio is increased when the monitored humidity is less than the nominal humidity. It is appreciated that EGR is not utilized because the engine operating mode is lean of stoichiometry, and therefore, intake oxygen concentration entering the engine cannot be controlled.

In a non-limiting scenario, when the monitored engine operating mode is stoichiometric and a monitored altitude deviates from a nominal altitude, the desired in-cylinder oxygen mass can be adjusted to maintain the desired combustion phasing by adjusting a desired intake oxygen concentration. Directly adjusting intake oxygen concentration entering the engine is not effective because the intake oxygen concentration does not change due to deviations in altitude, but rather, the in-cylinder oxygen mass changes. For instance, when a monitored altitude decreases, the ambient air is more dense, and therefore, the in-cylinder oxygen mass increases. Likewise, when the monitored altitude increases, the ambient air is less dense, and therefore, the in-cylinder oxygen mass decreases. In a non-limiting example, the desired intake oxygen concentration is decreased when the monitored altitude is greater than the nominal altitude. In another non-limiting example, the desired intake oxygen concentration is increased when the monitored altitude is less than the nominal altitude.

In a non-limiting scenario, when the monitored engine operating mode is lean of stoichiometry and a monitored altitude deviates from a nominal altitude, the desired in-cylinder oxygen mass can be adjusted to maintain the desired combustion phasing by adjusting a desired in-cylinder air-fuel ratio. In a non-limiting example, the desired in-cylinder air-fuel ratio is decreased when the monitored altitude is greater than the nominal altitude. In another non-limiting example, the desired in-cylinder air-fuel ratio is increased when the monitored altitude is less than the nominal altitude.

Embodiments envisioned further include controlling external EGR percentage entering the engine based on the EGR valve 38 position to achieve an adjusted desired intake oxygen concentration when the engine operating mode is stoichiometric and the monitored altitude deviates from the nominal altitude. Internal residual gas within the engine is controlled via adjusting the phasing of opening and closing of intake and exhaust valves 20, 18, respectively. As such, valve timing and phasing can include controlling negative valve overlap (NVO) to achieve an adjusted desired in-cylinder air-fuel ratio when the engine is operating lean of stoichiometry and at least one of a monitored humidity and altitude deviate from a respective one of a nominal humidity and altitude.

Figure 2:
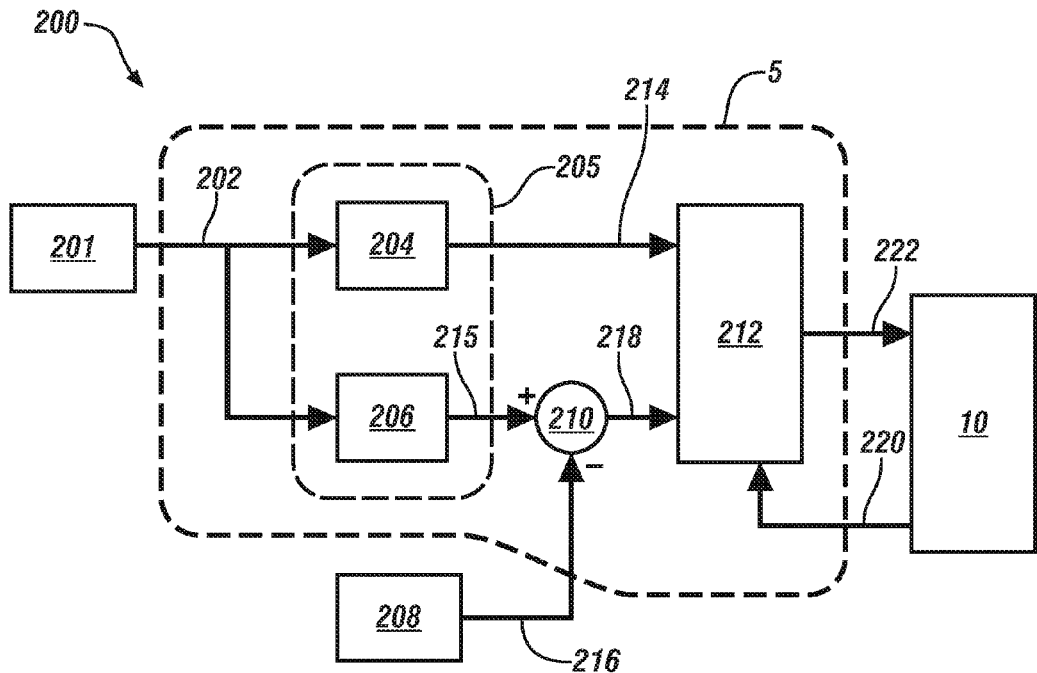
FIG. 2 illustrates a humidity compensation controller 200 for maintaining a desired combustion phasing in each cylinder of a multi-cylinder engine when a monitored humidity deviates from a nominal humidity in accordance with the present disclosure.

FIG. 2 illustrates a humidity compensation controller (HCC) 200 for maintaining a desired combustion phasing in each cylinder of a multi-cylinder engine when a monitored humidity deviates from a nominal humidity in accordance with the present disclosure. The HCC 200 is utilized when the engine operating mode is lean of stoichiometry. The HCC 200 includes a desired in-cylinder oxygen mass module (OMM) 205, a torque module 201, a humidity module 208, a difference unit 210 and a humidity compensation module (HCM) 212. The control module 5 has supervisory control over the OMM 205, the difference unit 210 and the HCM 212. The OMM 205 further includes a desired intake oxygen concentration module (DOM) 204 and a desired in-cylinder air-fuel ratio module (DAM) 206. Based on engine operating parameters 202, the DOM 204 and DAM 206 determine a desired intake oxygen concentration 214 and a desired in-cylinder air-fuel ratio 215, respectively. The desired intake oxygen concentration 214 and the desired in-cylinder air-fuel ratio 215 are determined to achieve a desired combustion phasing based on the engine operating parameters 202 without taking into consideration ambient parameters such as humidity influencing the combustion phasing. Further, each of the desired intake oxygen concentration 214 and the desired in-cylinder air-fuel ratio 215 maintain a desired in-cylinder oxygen mass. Hence, the desired in-cylinder oxygen mass maintains the desired combustion phasing without taking into consideration ambient parameters such as humidity influencing the combustion phasing. The engine operating parameters 202 can include desired engine speed and desired injected fuel mass and/or desired engine load in response to a torque request obtained by the torque module 301. As aforementioned, the torque request can be in response to an operator input (e.g., via the accelerator pedal and the brake pedal), or the torque request can be in response to an auto start condition monitored by the control module 5.

The humidity module 208 compares a monitored humidity (via humidity sensor 35) to a nominal humidity, and determines the humidity deviation 216 based on the comparing. Hence, the humidity deviation 216 is determined when the monitored humidity deviates from the nominal humidity. Based on the humidity deviation 216 and the desired in-cylinder air-fuel ratio 215, the difference unit 210 determines an adjusted desired in-cylinder air-fuel ratio 218 that is input to the HCM 212. Therefore, the adjusted desired in-cylinder air-fuel ratio 218 compensates for humidity deviation 218 to maintain the desired combustion phasing. The desired intake oxygen concentration 214 and the adjusted desired in-cylinder air-fuel ratio 218 are input to the HCM 212 and compared with a monitored combustion phasing 220 from a previous combustion cycle. The monitored combustion phasing 220 from the previous combustion cycle can further include an in-cylinder air-fuel ratio and/or an intake oxygen concentration from the previous combustion cycle. Based on the comparing, the HCM 212 determines combustion phasing parameters 222 provided to the engine 10 for a subsequent engine cycle. The combustion phasing parameters 222 can include external exhaust gas recirculation percentage entering the engine 10 to achieve the desired intake oxygen concentration and controlling internal residual gas within the engine via NVO to achieve the adjusted desired in-cylinder air-fuel ratio. Therefore, adjusting the desired in-cylinder air-fuel ratio when the engine operating mode is lean of stoichiometry can compensate for humidity deviation when the monitored humidity deviates from the nominal humidity in order to maintain the desired combustion phasing.

As aforementioned, when the engine operating mode is stoichiometric, the intake oxygen concentration entering the engine can be directly controlled via the EGR valve 38 position. Therefore, any influences to combustion phasing (i.e., increases/decreases in in-cylinder oxygen mass) due to deviations in humidity are offset by directly controlling the amount of external EGR percentage entering the engine. Hence, the HCC 200 is only required when the monitored engine operating conditions are lean of stoichiometry.

Figure 3:
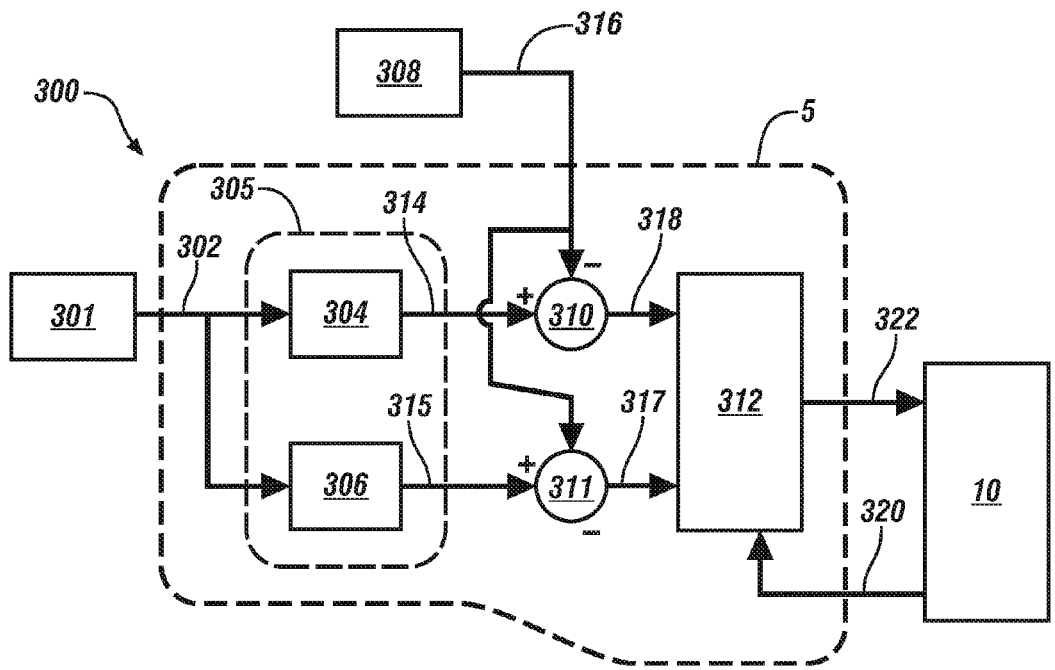
FIG. 3 illustrates an altitude compensation controller 300 for maintaining a desired combustion phasing in each cylinder of a multi-cylinder engine when a monitored altitude deviates from a nominal altitude in accordance with the present disclosure.

FIG. 3 schematically illustrates an altitude compensation controller (ACC) 300 for maintaining a desired combustion phasing in each cylinder of a multi-cylinder engine when a monitored altitude deviates from a nominal altitude in accordance with the present disclosure. The ACC 300 can be utilized when the engine operating mode is stoichiometric or lean of stoichiometry. The ACC 300 includes a desired in-cylinder oxygen mass module (OMM) 305, a torque module 301, an altitude module 308, difference units 310, 311 and an altitude compensation module (ACM) 312. The altitude module 308 compares a monitored altitude (via pressure sensor 36) to a nominal altitude. The control module 5 has supervisory control over the OMM 305, the difference units 310, 311 and the ACM 312. The OMM 305 further includes a desired intake oxygen concentration module (DOM) 304 and a desired in-cylinder air-fuel ratio module (DAM) 306. Based on engine operating parameters 302, the DOM 304 and DAM 306 determine a desired intake oxygen concentration 314 and a desired in-cylinder air-fuel ratio 315, respectively. The desired intake oxygen concentration 314 and the desired in-cylinder air-fuel ratio 315 are determined to achieve a desired combustion phasing based on the engine operating parameters 302 without taking into consideration ambient parameters such as altitude influencing the combustion phasing.

Further, each of the desired intake oxygen concentration 314 and the desired in-cylinder air-fuel ratio 315 maintain a desired in-cylinder oxygen mass. Hence, the desired in-cylinder oxygen mass maintains the desired combustion phasing without taking into consideration ambient parameters such as altitude influencing the combustion phasing. The engine operating parameters 302 can include desired engine speed and desired injected fuel mass and/or desired engine load in response to a torque request obtained by the torque module 301. As aforementioned, the torque request can be in response to an operator input (e.g., via the accelerator pedal and the brake pedal), or the torque request can be in response to an auto start condition monitored by the control module 5.

The altitude module 308 compares a monitored altitude (via pressure sensor 36) to a nominal altitude, and determines the altitude deviation 316 based on the comparing. Hence, the altitude deviation 316 is determined when the monitored altitude deviates from the nominal altitude.

When the monitored engine operating mode is stoichiometric, the desired intake oxygen concentration 314 is compared with the altitude deviation 316 to determine an adjusted desired intake oxygen concentration 318. Specifically, based on altitude deviation 316 and the desired intake oxygen concentration 314, the difference unit 310 determines an adjusted desired intake oxygen concentration 318 that is input to the ACC 312. Therefore, the adjusted desired intake oxygen concentration 318 compensates for altitude deviation 316 to maintain the desired combustion phasing. In this non-limiting embodiment, the desired in-cylinder air-fuel ratio 315 is not adjusted, and bypasses the difference unit 311, because the engine operating mode is stoichiometric. The desired in-cylinder air-fuel ratio 315 and the adjusted desired intake oxygen concentration 318 are input to the ACC 312 and compared with a monitored combustion phasing 320 from a previous combustion cycle. The monitored combustion phasing 320 from the previous combustion cycle can further include an in-cylinder air-fuel ratio and/or an intake oxygen concentration from the previous combustion cycle. Based on the comparing, the ACC 312 determines combustion phasing parameters 322 to the engine 10 for a subsequent engine cycle. The combustion phasing parameters 322 can include controlling external EGR percentage entering the engine 10 to achieve the adjusted desired intake oxygen concentration and controlling internal residual gas within the engine via NVO to achieve the desired in-cylinder air-fuel ratio. Therefore, adjusting the desired intake oxygen concentration when the engine operating mode is stoichiometric can compensate for altitude deviation when the monitored altitude deviates from the nominal altitude in order to maintain the desired combustion phasing.

When the monitored engine operating mode is lean of stoichiometry, the desired in-cylinder air-fuel ratio 315 is compared with the altitude deviation 316 to determine an adjusted desired in-cylinder air-fuel ratio 317. Specifically, based on the altitude deviation 316 and the desired in-cylinder air-fuel ratio 315, the difference unit 311 determines the adjusted desired in-cylinder air-fuel ratio 317 that is input to the ACC 312. Therefore, the adjusted desired in-cylinder air-fuel ratio 317 compensates for altitude deviation 316 to maintain the desired combustion phasing. In this non-limiting embodiment, the desired intake oxygen concentration 314 is not adjusted, and bypasses the difference unit 310, because the engine operating mode is operating lean of stoichiometry. The desired intake oxygen concentration 314 and the adjusted desired in-cylinder air-fuel ratio 317 are input to the ACC 312 and compared with the monitored combustion phasing 320 from a previous combustion cycle. Based on the comparing, the ACC 312 determines combustion phasing parameters 322 to the engine 10 for the subsequent engine cycle. The combustion phasing parameters 322 can include controlling external EGR percentage entering the engine 10 to achieve the desired intake oxygen concentration and controlling internal residual gas within the engine via NVO to achieve the adjusted desired in-cylinder air-fuel ratio. Therefore, adjusting the desired in-cylinder air-fuel ratio when the engine operating mode is lean of stoichiometry can compensate for altitude deviation when the monitored altitude deviates from the nominal altitude in order to maintain the desired combustion phasing.

Figure 4:
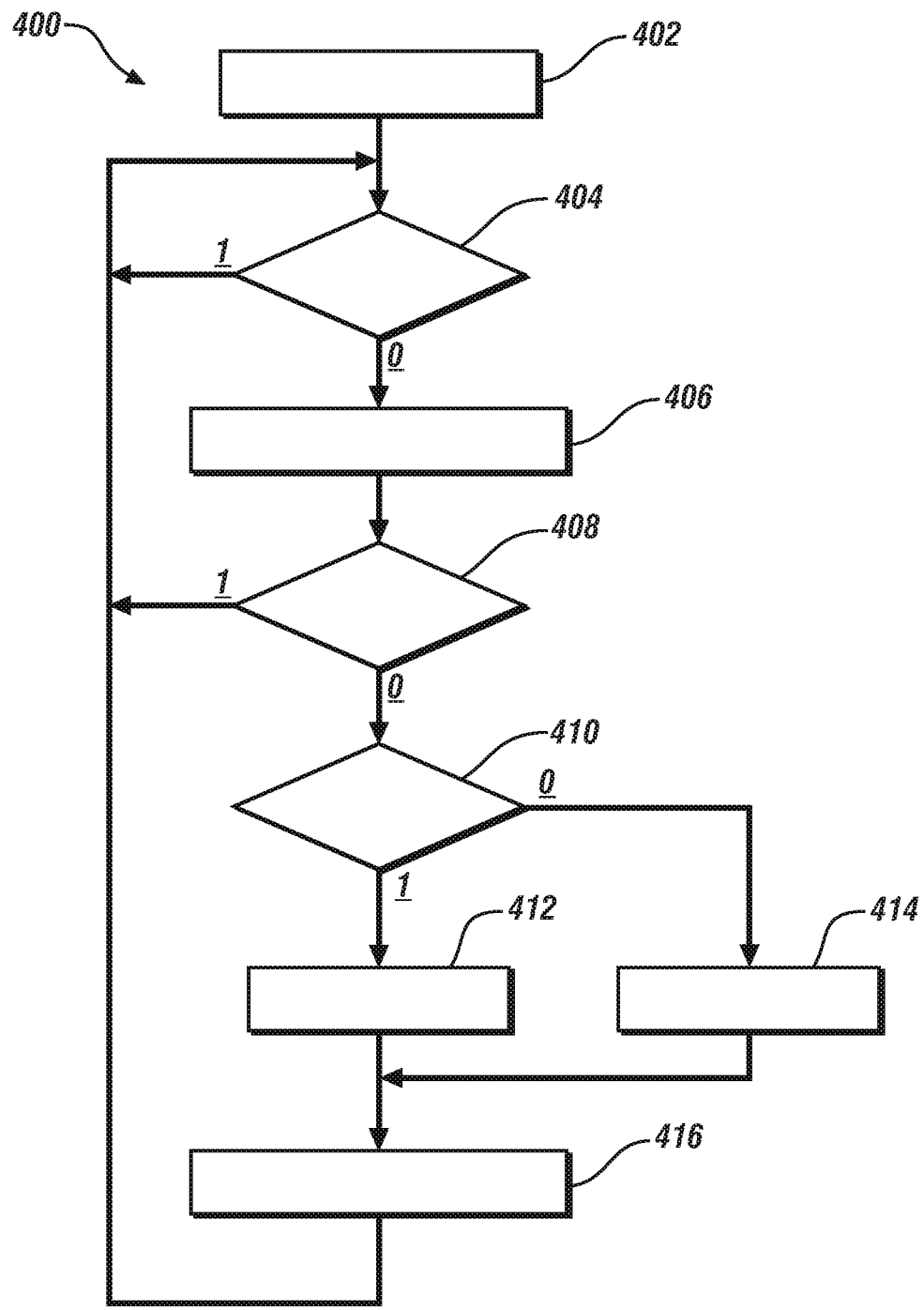
FIG. 4 illustrates a flow chart utilizing the humidity compensation controller 200 of FIG. 2 for maintaining a desired combustion phasing in each cylinder of a multi-cylinder engine in accordance with the present disclosure.

FIG. 4 illustrates a flow chart utilizing the humidity compensation controller (HCC) 200 of FIG. 2 for adjusting a desired in-cylinder air-fuel ratio when a monitored humidity deviates from a nominal humidity and a monitored engine operating mode is lean of stoichiometry in accordance with the present disclosure.

Table 1 is provided as a key to FIG. 4 wherein the numerically labeled blocks and the corresponding functions are set forth as follows.

TABLE 1

| FIG. 4 | |
|---|---|
| BLOCK | BLOCK CONTENTS |
| 402 | Start |
| 404 | Monitoring engine operating mode. Is the engine operating mode stoichiometric or lean of stoichiometry? A "1" indicates the engine is operating stoichiometric. A "0" indicates the engine operating mode is lean of stoichiometric. |
| 406 | Monitor the humidity |
| 408 | Is the monitored humidity equal to a nominal humidity? A "1" indicates a "yes" reverting back to decision block 404. A "0" indicates a "no" proceeding to decision block 410. |
| 410 | Is the monitored humidity greater than the nominal humidity? A "1" indicates a "yes" proceeding to block 412. A "0" indicates a "no" proceeding to block 414. |
| 412 | Decreasing the desired in-cylinder air-fuel ratio by an amount proportional to the amount the monitored humidity deviates from the nominal humidity |
| 414 | Increasing the desired in-cylinder air-fuel ratio by an amount proportional to the amount the monitored humidity deviates from the nominal humidity |
| 416 | Deliver signal to control module 5 indicating the adjusted desired in-cylinder air-fuel ratio based on one of blocks 412 or 414 |

Referring to block 402, the flowchart 400 starts and proceeds to decision block 404. Decision block 404 monitors the engine operating mode. A "1" indicates that the monitored engine operating mode is stoichiometric. As aforementioned, the intake oxygen concentration can be directly controlled and maintained via the EGR valve 38 position, and therefore no adjustments are required of the desired in-cylinder oxygen mass because any influences to the desired combustion phasing resulting from humidity deviation are offset by adjusting external EGR percentage entering the engine. Therefore, if the monitored engine operating mode is stoichiometric, indicated by a "1" the flow chart 400 reverts back to decision block 404. A "0" indicates that the monitored engine operating mode is lean of stoichiometry and the proceeds to block 406.

Block 406 monitors the humidity. Monitoring the humidity can be obtained from the humidity sensor 35. After humidity is monitored, the flow chart proceeds to decision block 408.

Referring to decision block 408, the monitored humidity is compared to a nominal or nominal humidity (hereinafter 'nominal humidity). A "1" indicates that the monitored humidity is equal to the nominal humidity and the flow chart reverts back to decision block 404. Hence, there is no deviation in humidity influencing the desired in-cylinder oxygen mass which in turn influences the desired combustion phasing. A "0" indicates that the monitored humidity is not equal to the nominal humidity and proceeds to decision block 410.

Decision block 410 determines if the monitored humidity is greater than the nominal humidity. The decision block 410 can correspond to the humidity deviation 216 illustrated in the HCC 200 of FIG. 2. A "1" indicates that the monitored humidity is greater than the nominal humidity and proceeds to block 412. A "0" indicates that the monitored humidity is less than the nominal humidity and proceeds to block 414.

Referring to block 412, the desired in-cylinder air-fuel ratio is decreased because the monitored humidity is greater than the nominal humidity. In a non-limiting example of the exemplary embodiment, the desired in-cylinder air-fuel ratio is decreased by an amount proportional to the amount the monitored humidity deviates from the nominal or nominal humidity. Block 412 can correspond to the adjusted desired in-cylinder air-fuel ratio 218 of the HCC 200 illustrated in FIG. 2, where the desired in-cylinder air-fuel ratio is decreased because the monitored humidity is greater than the nominal humidity. Block 412 proceeds to block 416.

Referring to block 414, the desired in-cylinder air-fuel ratio is increased because the monitored humidity is less than the nominal humidity. In a non-limiting example of the exemplary embodiment, the desired in-cylinder air-fuel ratio is increased by an amount proportional to the amount the monitored humidity deviates from the nominal or nominal humidity. Block 412 can correspond to the adjusted desired in-cylinder air-fuel ratio 218 of the HCC 200 illustrated in FIG. 2, where the desired in-cylinder air-fuel ratio is increased because the monitored humidity is less than the nominal humidity. Block 414 proceeds to block 416.

Therefore, when the monitored engine operating mode is lean of stoichiometry, the desired in-cylinder air-fuel ratio can be decreased by an amount corresponding to an amount the monitored humidity is greater than the nominal humidity (i.e., block 412). And, the desired in-cylinder air-fuel ratio can be increased by an amount corresponding to an amount the monitored humidity is less than the nominal humidity (i.e., block 414).

Referring to block 416, a signal is delivered to the control module 5 indicating the adjusted desired in-cylinder air-fuel ratio based on one of the determinations made in blocks 412 and 414. Thereafter, based on the signal indicating the adjusted desired in-cylinder air-fuel ratio, the control module 5 can control the internal residual gas within the engine via the NVO to achieve the adjusted desired in-cylinder air-fuel ratio by an amount corresponding to the humidity deviation 216 of FIG. 2 and thus, maintain the desired combustion phasing. Block 416 can correspond to the combustion phasing parameters 222 of FIG. 2.

Figure 5:
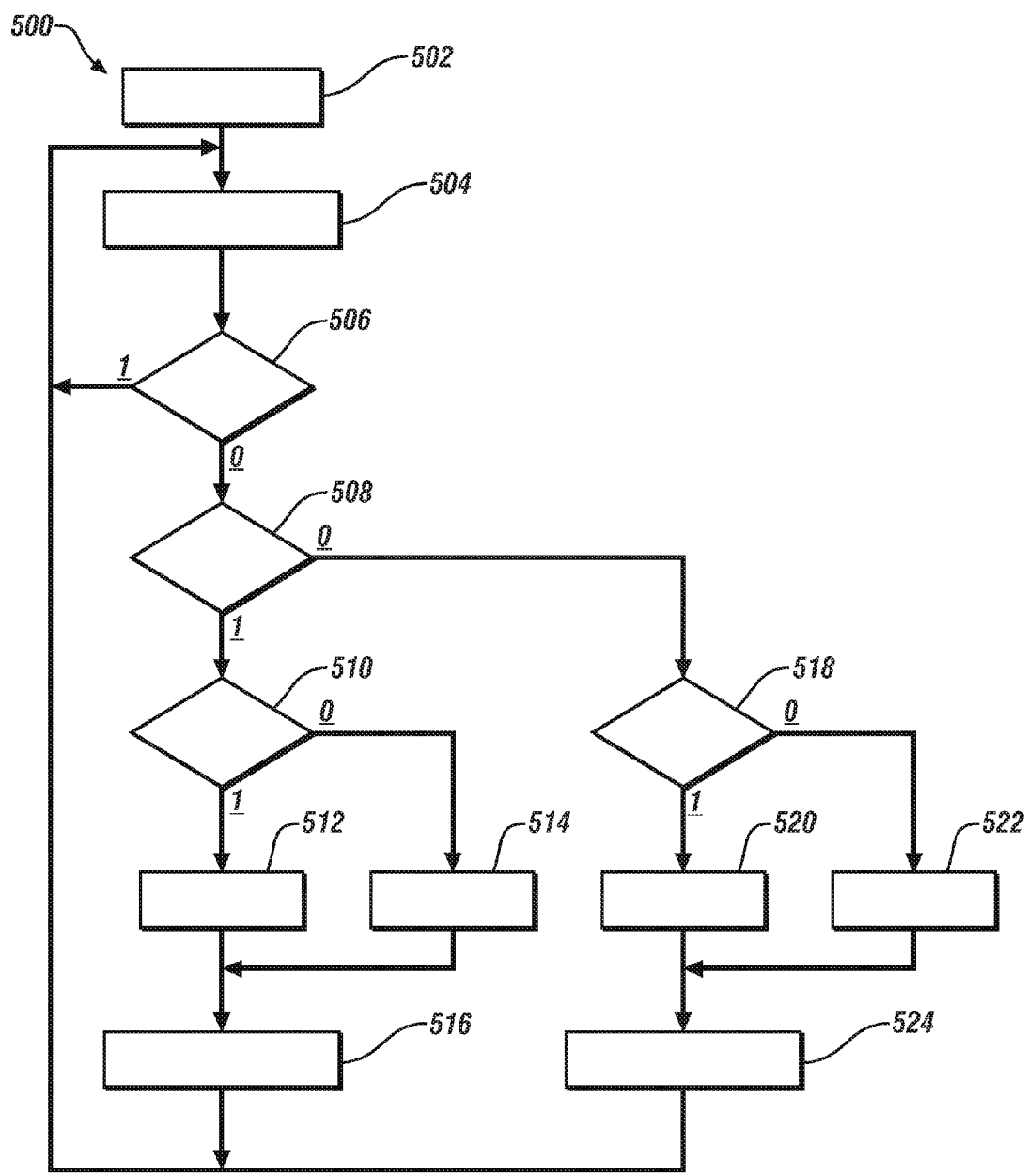
FIG. 5 illustrates a flow chart for operating the altitude compensation controller 300 of FIG. 3 for maintaining a desired combustion phasing in each cylinder of a multi-cylinder engine in accordance with the present disclosure.

FIG. 5 illustrates a flow chart utilizing the altitude compensation controller (ACC) 300 of FIG. 3 for adjusting a desired intake oxygen concentration when a monitored altitude deviates from a nominal altitude and the engine operating mode is stoichiometric and adjusting a desired in-cylinder air-fuel ratio when the monitored altitude deviates from the nominal altitude and the engine operating mode is lean of stoichiometry in accordance with the present disclosure.

Table 2 is provided as a key to FIG. 5 wherein the numerically labeled blocks and the corresponding functions are set forth as follows.

TABLE 2

FIG. 5

| BLOCK | BLOCK CONTENTS |
|---|---|
| 502 | Start |
| 504 | Monitor the altitude |
| 506 | Is the monitored altitude equal to a nominal altitude? A "1" indicates a "yes" proceeding back to block 504. A "0" indicates a "no" proceeding to decision block 508 |
| 508 | Monitoring engine operating mode. Is the engine operating mode stoichiometric or lean of stoichiometry? A "1" indicates the engine operating mode is stoichiometric proceeding to decision block 510. A "0" indicates the engine operating mode is lean of stoichiometric proceeding to decision block 518. |
| 510 | Is the monitored altitude greater than the nominal altitude? A "1" indicates a "greater than" proceeding to block 512. A "0" indicates a "less than" proceeding to block 514. |
| 512 | Decreasing a desired intake oxygen concentration by an amount proportional to the amount the monitored altitude deviates from the nominal altitude |
| 514 | Increasing a desired intake oxygen concentration by an amount proportional to the amount the monitored altitude deviates from the nominal altitude |
| 516 | Deliver signal to control module 5 indicating the adjusted desired intake oxygen concentration based on one of blocks 512 or 514 |
| 518 | Is the monitored altitude greater than the nominal altitude? A "1" indicates a "greater than" proceeding to block 520. A "0" indicates a "less than" proceeding to block 522. |
| 520 | Decreasing a desired in-cylinder air-fuel ratio by an amount proportional to the amount the monitored altitude deviates from the nominal altitude. |
| 522 | Increasing a desired in-cylinder air-fuel ratio by an amount proportional to the amount the monitored altitude deviates from the nominal altitude. |
| 524 | Deliver signal to control module 5 indicating the adjusted desired in-cylinder air-fuel ratio based on one of blocks 512 or 514 |

Referring to block 502, the flowchart 500 starts and proceeds to decision block 504. The altitude is monitored at block 504. Monitoring the altitude can be obtained from the pressure sensor 36 measuring the barometric pressure. After the altitude is monitored, the flowchart 500 proceeds to decision block 506.

Referring to decision block 506, the monitored altitude is compared to a nominal altitude. A "1" indicates that the monitored altitude is equal to the nominal altitude and the flowchart 500 reverts back to block 504. A "0" indicates that the monitored altitude is not equal to the nominal altitude and proceeds to decision block 508.

Referring to decision block 508, the flowchart 500 monitors the engine operating mode. A "1" indicates that the monitored engine operating mode is stoichiometric and proceeds to decision block 510. A "0" indicates that the monitored engine operating mode is lean of stoichiometry and proceeds to decision block 518.

Referring to decision block 510, it is determined whether the monitored altitude is greater than the nominal altitude. The decision block 510 can correspond to the altitude deviation 316 illustrated in the ACC 300 of FIG. 3. A "1" indicates that the monitored altitude is greater than the nominal or nominal altitude and proceeds to block 512. A "0" indicates that the monitored altitude is less than the nominal altitude and proceeds to block 514.

Referring to block 512, the desired intake oxygen concentration is decreased because the monitored altitude is greater than the nominal altitude. In a non-limiting example of the exemplary embodiment, the desired intake oxygen concentration is decreased by an amount proportional to the amount the monitored altitude deviates from the nominal altitude. Block 512 can correspond to the adjusted desired intake oxygen concentration 318 of the ACC 300 illustrated in FIG. 3, where the desired intake oxygen concentration is decreased because the monitored altitude is greater than the nominal altitude. Block 512 proceeds to block 516.

Referring to block 514, the desired intake oxygen concentration is increased because the monitored altitude is less than the nominal altitude. In a non-limiting example of the exemplary embodiment, the desired intake oxygen concentration is increased by an amount proportional to the amount the monitored altitude deviates from the nominal altitude. Block 514 can correspond to the adjusted desired intake oxygen concentration 318 of the ACC 300 illustrated in FIG. 3, where the desired intake oxygen concentration is increased because the monitored altitude is less than the nominal altitude. Block 514 proceeds to block 516.

As aforementioned, the desired intake oxygen concentration corresponds to a desired external EGR percentage entering the engine. Therefore, when the monitored engine operating mode is stoichiometric, the desired external EGR percentage can be decreased by an amount corresponding to an amount the monitored altitude is greater than the nominal altitude (i.e., block 512); and the desired external EGR percentage can be increased by an amount corresponding to an amount the monitored altitude is less than the nominal altitude (i.e., block 514).

Referring to block 516, a signal is delivered to the control module 5 indicating the adjusted desired intake oxygen concentration (i.e., adjusted desired external EGR percentage) based on one of the determinations made in blocks 512 and 514. Thereafter, based on the signal indicating the adjusted desired intake oxygen concentration (i.e., adjusted desired external EGR percentage), the control module 5 can control the external EGR percentage entering the engine via the EGR valve 38 position to achieve the adjusted desired intake oxygen (i.e., adjusted desired external EGR percentage) concentration by an amount corresponding to the altitude deviation 316 of FIG. 3, and thus, maintain the desired combustion phasing. Block 516 can correspond to the combustion phasing parameters 322 of FIG. 3.

Referring to decision block 518, it is determined whether the monitored altitude is greater than the nominal altitude. The decision block 518 can correspond to the altitude deviation 316 illustrated in the ACC 300 of FIG. 3. A "1" indicates that the monitored altitude is greater than the nominal altitude and proceeds to block 520. A "0" indicates that the monitored altitude is less than the nominal altitude and proceeds to block 522.

Referring to block 520, the desired in-cylinder air-fuel ratio is decreased because the monitored altitude is greater than the nominal altitude. In a non-limiting example of the exemplary embodiment, the desired in-cylinder air-fuel ratio is decreased by an amount proportional to the amount the monitored altitude deviates from the nominal altitude. Block 520 can correspond to the adjusted desired in-cylinder air-fuel ratio 317 of the ACC 300 illustrated in FIG. 3, where the desired in-cylinder air-fuel ratio is decreased because the monitored altitude is greater than the nominal altitude. Block 520 proceeds to block 524.

Referring to block 522, the desired in-cylinder air-fuel ratio is increased because the monitored altitude is less than the nominal altitude. In a non-limiting example of the exemplary embodiment, the desired in-cylinder air-fuel ratio is increased by an amount proportional to the amount the monitored altitude deviates from the nominal altitude. Block 522 can correspond to the adjusted desired in-cylinder air-fuel ratio 317 of the ACC 300 illustrated in FIG. 3, where the desired in-cylinder air-fuel ratio is increased because the monitored altitude is less than the nominal altitude. Block 522 proceeds to block 524.

Therefore, when the monitored engine operating mode is lean of stoichiometry, the desired in-cylinder air-fuel ratio can be decreased by an amount corresponding to an amount the monitored altitude is greater than the nominal altitude; and the desired in-cylinder air-fuel ratio can be increased by an amount corresponding to an amount the monitored altitude is less than the nominal altitude.

Referring to block 524, a signal is delivered to the control module 5 indicating the adjusted desired in-cylinder air-fuel ratio based on one of the determinations made in blocks 512 and 514. Thereafter, based on the signal indicating the adjusted desired in-cylinder air-fuel ratio, the control module 5 can control the internal residual gas within the engine via NVO to achieve the adjusted desired in-cylinder air-fuel ratio by an amount corresponding to the altitude deviation 316 of FIG. 3, and thus, maintain the desired combustion phasing. Block 524 can correspond to the combustion phasing parameters 322 of FIG. 3.

The HCC 200 and flowchart 400 associated therewith, can be utilized separately or simultaneously with the ACC 300 and flowchart 500 associated therewith. Ambient parameters such as humidity and altitude effecting the desired in-cylinder oxygen mass, and thereby, influencing combustion phasing can be compensated for utilizing the methods discussed above without the need for set point calibration for each humidity and altitude value corresponding to each engine speed and load to maintain the desired combustion phasing.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling combustion in a spark-ignition direct-injection internal combustion engine, comprising:
monitoring an engine operating mode and an ambient parameter;
determining a deviation of the ambient parameter relative to a nominal ambient parameter;
determining a nominal desired engine operation parameter based on engine speed and load, wherein said nominal engine operation parameter comprises one of a nominal desired oxygen concentration and a nominal desired air/fuel ratio;
determining an adjusted desired engine operation parameter based on said nominal desired engine operation parameter and said deviation of the ambient parameter, wherein said adjusted desired engine operation parameter comprises one of an adjusted desired oxygen concentration and an adjusted desired air/fuel ratio; and
controlling the engine based on the engine operating mode and one of said nominal desired engine operation parameter and adjusted desired engine operation parameter, comprising one of:
when the engine operating mode is stoichiometric, controlling external exhaust gas recirculation entering the engine based on the adjusted desired oxygen concentration when the monitored ambient parameter comprises altitude, and
when the engine operating mode is stoichiometric, controlling external exhaust gas recirculation entering the engine based on the nominal desired oxygen concentration when the monitored ambient parameter comprises humidity.

2. The method of claim 1 wherein:
said ambient parameter comprises humidity;
said nominal desired engine operation parameter comprises the nominal desired air/fuel ratio; and
controlling the engine is based on the adjusted desired air/fuel ratio when said engine operating mode is lean of stoichiometric.

3. The method of claim 1 wherein:
said ambient parameter comprises altitude;
said nominal desired engine operation parameter comprises the nominal desired air/fuel ratio; and
controlling the engine is based on the adjusted desired air/fuel ratio when said engine operating mode is lean of stoichiometric.

4. Method for controlling combustion in a spark-ignition direct-injection internal combustion engine, comprising:
monitoring an engine operating mode and humidity
determining a deviation of the humidity relative to a nominal humidity;
determining a desired nominal air/fuel ratio based on engine speed and load;
determining an adjusted desired air/fuel ratio based on said nominal desired air/fuel ratio and said deviation of the humidity; and
controlling a negative valve overlap of the engine based on the adjusted air/fuel ratio when said engine operating mode is lean of stoichiometric.

5. Method for controlling combustion in a spark-ignition direct-injection internal combustion engine, comprising:
monitoring an engine operating mode and altitude;
determining a deviation of the altitude relative to a nominal altitude;
determining a nominal desired air/fuel ratio based on engine speed and load;
determining and adjusted desired air/fuel ratio based on said nominal desired air/fuel ratio and said deviation of the altitude; and
controlling a negative valve overlap of the engine based on the adjusted air/fuel ratio when the engine operating mode is lean of stoichiometric.

6. Method for controlling combustion in a spark-ignition direct-injection internal combustion engine, comprising:

monitoring an engine operating mode and altitude;
determining a deviation of the altitude relative to a nominal altitude;
determining a nominal desired oxygen concentration based on engine speed and load;
determining an adjusted desired oxygen concentration based on said nominal desired engine operation parameter and said deviation of the altitude; and
controlling the engine based on the adjusted desired oxygen concentration when said engine operating mode is stoichiometric.

7. The method of claim 6 wherein:
controlling the engine comprises controlling an external exhaust gas recirculation based on the adjusted desired oxygen concentration.

8. Method for controlling combustion in a spark-ignition direct-injection internal combustion engine, comprising:
monitoring engine operating mode, ambient humidity and ambient pressure;
controlling in-cylinder oxygen mass for maintaining a desired combustion phasing based on engine speed and load, comprising:
determining a nominal externally recirculated exhaust gas setting for maintaining a desired in-cylinder oxygen mass at nominal humidity and nominal pressure;
determining a nominal in-cylinder air-fuel ratio setting for maintaining the desired in-cylinder oxygen mass at the nominal humidity and nominal pressure;
when the engine operating mode is stoichiometric and the ambient pressure deviates from the nominal pressure, controlling the externally recirculated exhaust gas from said nominal externally recirculated exhaust setting; and
when the engine operating mode is lean of stoichiometric and at least one of the ambient pressure deviates from the nominal pressure and the ambient humidity deviates from the nominal humidity, controlling the in-cylinder air-fuel ratio from said nominal in-cylinder air-fuel ratio setting.

9. The method of claim 8 wherein controlling the externally recirculated exhaust gas comprises decreasing the externally recirculated exhaust gas from the nominal externally recirculated exhaust gas setting when the ambient pressure is greater than the nominal pressure, and increasing the externally recirculated exhaust gas from the nominal externally recirculated exhaust gas setting when the ambient pressure is less than the nominal pressure.

10. The method of claim 8 wherein controlling the in-cylinder air-fuel ratio comprises decreasing the in-cylinder air-fuel ratio from the nominal in-cylinder air-fuel ratio setting when the ambient pressure is greater than the nominal pressure, and increasing the in-cylinder air-fuel ratio from the nominal in-cylinder air-fuel ratio setting when the ambient pressure is less than the nominal pressure.

11. The method of claim 8 wherein controlling the in-cylinder air-fuel ratio comprises decreasing the in-cylinder air-fuel ratio from the nominal in-cylinder air-fuel ratio setting when the ambient humidity is greater than the nominal humidity, and increasing the in-cylinder air-fuel ratio from the nominal in-cylinder air-fuel ratio setting when the ambient humidity is less than the nominal humidity.

12. Apparatus for controlling a multi-cylinder spark-ignition direct-injection internal combustion engine, comprising:
an external exhaust gas recirculation valve;
a variable cam phasing mechanism to control phasing of engine intake and exhaust valves;
a control module:
monitoring engine operating mode, ambient humidity and ambient pressure;
determining a nominal externally recirculated exhaust gas setting for the external exhaust gas recirculation valve to maintain a desired in-cylinder oxygen mass at nominal humidity and nominal pressure;
determining a nominal negative valve overlap setting for the variable cam phasing mechanism to maintain a maintaining the desired in-cylinder oxygen mass at the nominal humidity and nominal pressure;
when the engine operating mode is stoichiometric and the ambient pressure deviates from the nominal pressure, controlling the external exhaust gas recirculation valve from said nominal externally recirculated exhaust setting; and
when the engine operating mode is lean of stoichiometric and at least one of the ambient pressure deviates from the nominal pressure and the ambient humidity deviates from the nominal humidity, controlling the variable cam phasing mechanism from said nominal negative valve overlap setting.

* * * * *